Feb. 14, 1967   B. B. JOHANNSEN   3,303,891
MOLDBOARD PLOW
Filed May 21, 1965

INVENTOR.
BRUNO B. JOHANNSEN
BY
ATTORNEY

000
United States Patent Office 3,303,891
Patented Feb. 14, 1967

3,303,891
MOLDBOARD PLOW
Bruno B. Johannsen, Moline, Ill., assignor to Deere & Company, Moline, Ill., a corporation of Delaware
Filed May 21, 1965, Ser. No. 457,666
2 Claims. (Cl. 172—254)

The present invention relates generally to agricultural implements and more particularly to tractor-drawn moldboard gang plows.

It is an object of the present invention to provide a frame for a tractor-drawn moldboard gang plow to which moldboards of different width or cuts may be secured.

A further object of the present invention is to provide a frame for a gang plow in which the fore-and-aft clearance between plow bottoms may be adjusted.

Another object of the present invention is to provide a frame for a tractor-drawn moldboard gang plow to which bottoms of different cuts may be secured while maintaining the same fore-and-aft clearance between the bottoms of the different cuts.

A still further object of the present invention is to provide a frame for a gang plow which is relatively simple to manufacture, low in cost, and of high durability.

These and other objects and advantages of this invention will be apparent to those skilled in the art after a consideration of the following detailed description, taken in conjunction with the accompanying drawings, in which the preferred form of this invention is illustrated.

In the following description, right-hand and left-hand reference is determined by standing to the rear of the plow and facing its direction of travel.

Figure 1:
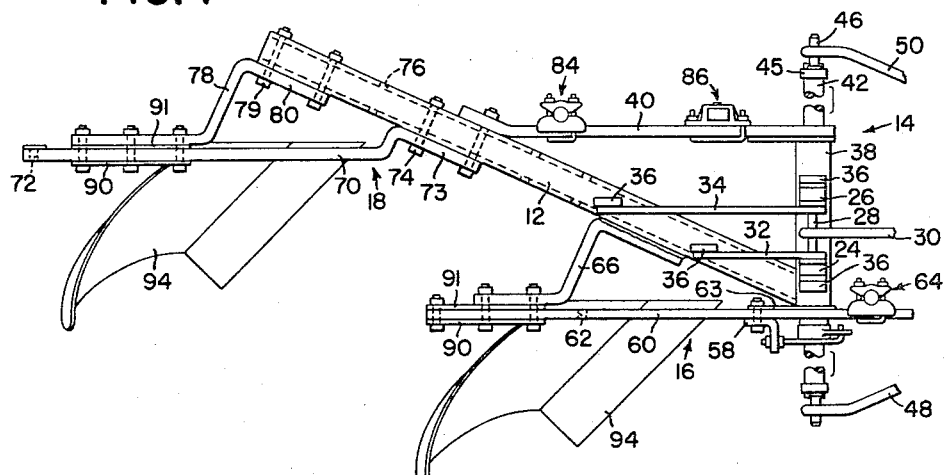
FIG. 1 is a plan view of a two-bottom moldboard plow in which the principles of the present invention have been incorporated, the frame being shown with moldboards of the largest cut with which it is adapted to be used, the moldboards having normal fore-and-aft clearance.
Figure 2:
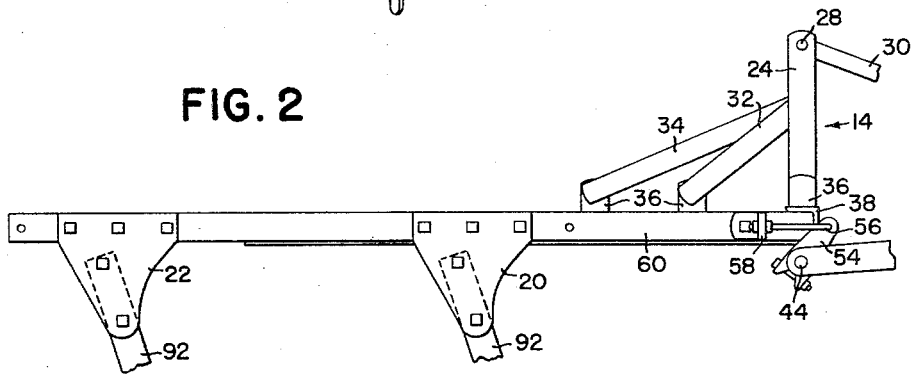
FIG. 2 is a side elevation view of FIG. 1.

Referring first to FIGS. 1 and 2, the plow in which the principles of this invention have been incorporated has a frame including a diagonal main frame member 12 and a mast, indicated generally at 14, which is secured to the forward end of the diagonal main frame member 12. The plow includes front and rear standard support structures 16 and 18, respectively, to which are secured front and rear standards 20, 22 (FIG. 2). The front and rear standards are substantially identical and could be interchanged if so desired.

The mast 14 includes right-hand and left-hand bars 24, 26, respectively, which at their upper ends receive transversely extending pin means 28 to which the rear end of the compression link 30 of a conventional farm tractor may be secured. The upper ends of the right and left bars 24, 26 are held from relative swinging movement by right and left braces 32, 34. The lower end of the right and left bars 24, 26 as well as the lower ends of the braces 32, 34 are secured to upstanding lugs 36 which are welded or otherwise secured to appropriate supporting structure. A transversely extending angle iron 38 is secured at its right-hand end to the forward end of the diagonal main frame member 12 and at its left-hand end to a forwardly extending main frame brace 40. A transversely extending rotatable shaft 42 is mounted for rotational movement within structure that depends from the angle iron 38. The right end of the shaft 42 is provided with right hitch pin 44 and the left end of the shaft 42 carries a crank arm 45 which carries at its remote end the left hitch pin 46 to which the right and left lower links 48, 50 of a conventional farm tractor may be secured. To provide for landing of the plow behind the tractor, a rock arm 54 is mounted on the right-hand end of the shaft 42 and is secured at its upper end to an adjustable screw 56 which cooperates with an outwardly projecting lug 58.

Each of the standard support structures 16, 18 is provided with a bar and a brace. The bar 60 of the front standard support structure is provided with a longitudinally extending rear portion which is provided with a plurality of equally spaced apertures 62, and a forward end that is secured to the mast 14 and projects somewhat forwardly thereof. The bar 60 is secured at its forward end to a plate 63 which is welded or otherwise secured to the right-hand end of the angle iron 38. The lug 58 is bolted to the bar 60 and plate 63 as can be seen in FIG. 1. Mounted on the forward end of the bar 60 is a colter-clamp structure indicated generally at 64. The brace 66 of the front standard support structure is provided with a forward diagonally extending portion that is welded to the diagonal main frame member 12 but could be otherwise secured to it by means of bolting, and the rear portion of the brace is provided with a longitudinally extending apertured portion which may be secured to the bar 60 by means of bolts.

The bar 70 of the rear standard support structure 18 is provided with a plurality of equally spaced apart apertures in its rear end as at 72, and is provided at its forward end with a diagonally extending portion 73 which is apertured and suitably secured by means of bolts 74 to the diagonal main frame member 12, the bolts passing within alined apertures 76 of the main frame member. At this point it should be noted that the main frame member is provided with a plurality of equally spaced apart apertures 76 which can receive bolts 74 for positioning the rear standard support structure 18 in a plurality of positions. The brace 78 of the rear standard support structure is provided with a forward diagonal extending portion 80 which is also secured by means of bolts 79 to the apertures 76 within the member 12.

Mounted on the main frame brace 40 is a colter-clamp 84 and a clamp 86 which may receive either a parking stand or a gauge wheel and its associated structure.

Each of the standards 20, 22 includes two upper spaced apart plates 90, 91 which are suitably apertured and adapted to be placed in alined position with apertures 62 or 72 in the bars 60, 70, and also in alinement with the apertures in the rear end of the braces 66, 78. The standards also include a shank portion 92 which receives at its lower end moldboards 94.

Figure 3:
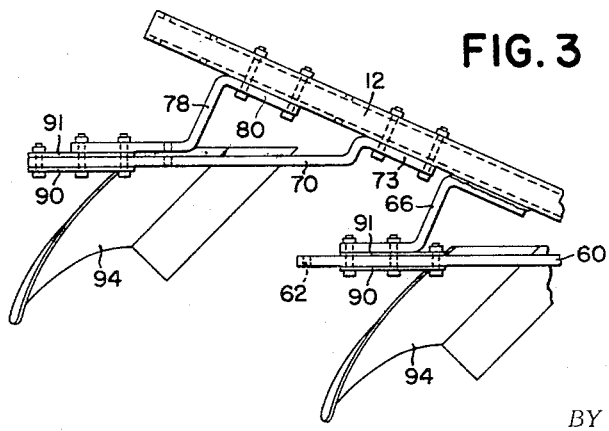
FIG. 3 is a partial plan view of the plow frame shown in FIG. 1 in which parts of the plow have been arranged for used of moldboards of the smallest size cut usable with the plow frame and in which the fore-and-aft spacing is substantially the same as that shown in FIG. 1.

It should be obvious from the foregoing that the frame of this plow is designed so that bottoms 94 of different widths or cuts may be mounted on the frame while maintaining substantially the same fore-and-aft clearance. In FIG. 1 the standard support structures 16 and 18 are shown in the position that they are mounted when using bottoms 94 of the widest cut for which this plow is designed. In this position the rear support 18 is secured with the portions 80 and 73 secured in the rearmost possible apertures of the frame member 12. The standards 20, 22 are secured to the bars 60, 70 in such a manner that the forward standard 20 is secured to the bar with the rear apertures of the bar in alinement with the apertures within the upper portion of the standard and the rear standard is secured to the bar 70 with the forward apertures of the bar 70 in alinement with the apertures in the standard 22. In FIG. 3 the plow frame is shown with the smallest size bottom 94 for which the plow is designed. In this position the rear support is moved forward two places and secured by means of bolts. To maintain substantially the same fore-and-aft clearance in this position as in FIG. 1, the front standard is mounted forward on the bar 60 so that the spaced apart plates of the front standard are in alinement with the forward holes 62 on the bar 60, and similarly the rear standard is moved back so that its upper portion is in alinement with the rearmost holes 72 on the bar 70.

If a plow bottom of an intermediate size is to be used, it should be obvious that the rear standard support 18 is mounted in a position intermediate that shown in FIGS. 1 and 3 and that only one of the standards is moved to the position shown in FIG. 3 from that shown in FIG. 1.

While in the foregoing reference has been made to a two-bottom plow, it should be obvious that the principles of the present invention may be equally as well incorporated in plows having more than two bottoms, as for example a three-bottom plow. Also it should be noted that while the foregoing has been limited to an integral plow, it should also be obvious that the principles may be incorporated in other forms of plows, such as for example a rollover or two-way plow.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. A tractor-drawn gang plow having a frame including a generally diagonally extending main frame member having a plurality of longitudinally spaced apart apertures, a plurality of standards each having in their upper ends a plurality of longitudinally spaced apart aperture means, a plurality of standard support means to which the standards are secured including front and rear standard support means, each of the standard support means being secured to the frame and including a bar having a longitudinally extending portion having an apertured rear end to which the upper end of a standard may be secured by means of bolts and a brace secured at its rear end to the rear end of the bar and extending forwardly and laterally outwardly to the diagonally extending main frame bar, the bar of the front standard support means having a forward portion which is secured to the frame and the rear end being provided with apertures in excess of the number in the upper end of the standards whereby the upper end of a standard may be longitudinally adjustably secured to the front standard support means, the outer end of the brace and the forward end of the bar of the rear standard support means being provided with diagonally extending apertured portions which may be secured to the diagonal member in a plurality of positions by bolts which are received within alined apertures, the rear end of the bar of the rear member having apertures in excess of the member in the upper end of the standards whereby the upper end of a standard may be longitudinally adjustably secured to the rear standard support means.

2. A tractor-drawn two-bottom gang plow comprising: a frame including a diagonally extending main frame member provided with a plurality of equally spaced apart apertures, front and rear standards each having three equally spaced apart holes disposed at the upper end thereof, front and rear standard support means, each support means having a bar having a longitudinally extending rear portion with four equally spaced apart apertures therein and a brace interconnecting the rear end of the bar and the diagonally extending main frame member, the forward end of the bar of the front standard support means being secured to the frame and the forward end of the bar and brace of the rear standard support means being provided with apertured diagonally extending portions which are secured to the apertured diagonally extending main frame member for three positions of adjustment, and bolt means adjustably securing the standards to the longitudinally extending bar portion in two positions of adjustment, the parts being so arranged and constructed that the rear standard may be adjustably positioned relative to the forward standard to receive bottoms of three different cuts, the standards being adjustable on the standard support means whereby the same fore-and-aft clearance may be maintained in each of the three different cut spacings.

References Cited by the Examiner

UNITED STATES PATENTS

| | | | |
|---|---|---|---|
| 1,072,169 | 9/1913 | Sanders | 172—776 |
| 1,287,960 | 12/1918 | Gleiche | 172—265 |

ABRAHAM G. STONE, *Primary Examiner.*

J. R. OAKS, *Assistant Examiner.*